US009198033B2

(12) United States Patent
Buddhikot et al.

(10) Patent No.: US 9,198,033 B2
(45) Date of Patent: Nov. 24, 2015

(54) METHOD AND APPARATUS FOR AUTHENTICATING NODES IN A WIRELESS NETWORK

(75) Inventors: Milind Madhav Buddhikot, Manalapan, NJ (US); Charles Payette, Oceanport, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2435 days.

(21) Appl. No.: 11/862,561

(22) Filed: Sep. 27, 2007

(65) Prior Publication Data

US 2009/0086973 A1     Apr. 2, 2009

(51) Int. Cl.
*H04L 29/00* (2006.01)
*H04W 12/04* (2009.01)
(Continued)

(52) U.S. Cl.
CPC ............ *H04W 12/04* (2013.01); *H04L 9/0822* (2013.01); *H04L 9/0833* (2013.01); *H04L 9/321* (2013.01);
(Continued)

(58) Field of Classification Search
CPC .... H04W 12/04; H04W 12/06; H04L 9/0822; H04L 9/0833; H04L 9/321; H04L 9/3271; H04L 63/062; H04L 63/0823; H04L 2209/80; H04L 2463/062
USPC .................................. 713/171; 380/270, 278
See application file for complete search history.

(56) References Cited

U.S. PATENT DOCUMENTS 7,275,157 B2 *  9/2007  Cam Winget ................. 713/168
7,461,253 B2 * 12/2008  Braskich et al. ............. 713/169
(Continued)

FOREIGN PATENT DOCUMENTS

CN         1662001        8/2005
JP       2006094004        4/2006
(Continued)

OTHER PUBLICATIONS

"911—NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.
(Continued)

*Primary Examiner* — Michael Pyzocha
(74) *Attorney, Agent, or Firm* — Wall & Tong, LLC

(57) ABSTRACT

The invention includes a method and apparatus for authenticating a wireless node requesting to join a network. A method includes receiving an authentication request from the wireless node, negotiating at least one authentication parameter with the wireless node, deriving a first encryption key using the at least one authentication parameter, encrypting a second encryption key using the first encryption key, and propagating the encrypted second encryption key toward the wireless node, wherein the wireless node independently derives the first encryption key for use in decrypting the encrypted second encryption key received from the authentication server node. The wireless node decrypts the encrypted second encryption key and stores the second encryption key for use to securely communicate with other wireless nodes of the network. In one embodiment, the present invention may be implemented using a modified version of the EAP-TLS protocol, in which rather than a Pairwise Master Key (PMK) being sent from the authentication server node to the wireless node, the authentication server node and the wireless node each derive the PMK and the authentication server node securely provides a group encryption key to the wireless node by encrypting the group encryption key using the PMK.

17 Claims, 10 Drawing Sheets

(51) Int. Cl.
*H04L 9/08* (2006.01)
*H04L 9/32* (2006.01)
*H04L 29/06* (2006.01)
*H04W 12/06* (2009.01)

(52) U.S. Cl.
CPC ............ *H04L 9/3271* (2013.01); *H04L 63/062* (2013.01); *H04L 63/0823* (2013.01); *H04L 2209/80* (2013.01); *H04L 2463/062* (2013.01); *H04W 12/06* (2013.01)

(56) References Cited

U.S. PATENT DOCUMENTS

| | | | |
|---|---|---|---|
| 7,529,925 B2 * | 5/2009 | Harkins | 713/155 |
| 7,596,225 B2 * | 9/2009 | Mizikovsky et al. | 380/273 |
| 7,669,230 B2 * | 2/2010 | Chaplin | 726/2 |
| 2003/0095663 A1 | 5/2003 | Nelson et al. | |
| 2003/0226017 A1 * | 12/2003 | Palekar et al. | 713/168 |
| 2005/0032506 A1 * | 2/2005 | Walker | 455/411 |
| 2005/0063544 A1 * | 3/2005 | Uusitalo et al. | 380/277 |
| 2005/0143065 A1 * | 6/2005 | Pathan et al. | 455/432.1 |
| 2005/0152305 A1 * | 7/2005 | Ji et al. | 370/328 |
| 2006/0002351 A1 * | 1/2006 | Madour | 370/338 |
| 2006/0067272 A1 * | 3/2006 | Wang et al. | 370/331 |
| 2006/0107050 A1 * | 5/2006 | Shih | 713/171 |
| 2006/0200678 A1 * | 9/2006 | Yamada et al. | 713/182 |
| 2007/0005972 A1 * | 1/2007 | Mizikovsky et al. | 713/171 |
| 2007/0058808 A1 * | 3/2007 | Rudolf et al. | 380/44 |
| 2007/0153739 A1 * | 7/2007 | Zheng | 370/331 |
| 2007/0189249 A1 | 8/2007 | Gurevich et al. | |
| 2007/0192600 A1 * | 8/2007 | Wong et al. | 713/168 |
| 2007/0206537 A1 | 9/2007 | Cam-Winget et al. | |
| 2007/0288997 A1 * | 12/2007 | Meier et al. | 726/4 |
| 2007/0297611 A1 * | 12/2007 | Yun et al. | 380/270 |
| 2008/0019520 A1 * | 1/2008 | Nakahara | 380/247 |
| 2008/0045180 A1 * | 2/2008 | Yang et al. | 455/411 |
| 2008/0108322 A1 * | 5/2008 | Upp | 455/411 |
| 2008/0204248 A1 * | 8/2008 | Cam Winget et al. | 340/572.4 |
| 2009/0019284 A1 * | 1/2009 | Cho et al. | 713/170 |
| 2009/0327736 A1 * | 12/2009 | Cam-Winget et al. | 713/181 |

FOREIGN PATENT DOCUMENTS

| | | |
|---|---|---|
| JP | 2007-181206 | 12/2007 |
| WO | WO 2006/086932 | 8/2006 |
| WO | WO 2006/093161 | 9/2006 |

OTHER PUBLICATIONS

International Search Report and Written Opinion of the International Searching Authority, or the Declaration, mailed May 7, 2009, in PCT/US2008/010995, Lucent Technologies Inc. Applicant, 12 pages.

Chinese Office Action in corresponding CN 200880108732.5, dated Feb. 23, 2012, pp. 1-7.

JP Office Action in corresponding JP 2010-526920, dated Jul. 31, 2012, pp. 1-3.

Network Magazine, "Wireless is Secured. Updated Security", published by ASCII Inc., vol. 12, No. 8, Aug. 1, 2007, pp. 54-55.

JP Office Action in corresponding JP 2010-526920, dated Dec. 26, 2012, pp. 1-5.

Cam-Winget, "IEEE 802.11i Overview", downloaded Feb. 17, 2015 from http://csrc.nist.gov/archive/wireless/S10_802.11i%)Overview-jw1.pdf, Dec. 2002, pp. 1-45.

JP Office Action in corresponding JP 2010-526920, dated Dec. 10, 2013, pp. 1-4.

Labiod, H. et al., "KMS: A Key Management System for Multi-provider Interconnected Wi-Fi WLANSs", IEEE Communications Society, Global Telecommunications Conference (Globecom) 2004, Nov. 29-Dec. 3, 2004, pp. 2061-2066.

* cited by examiner

METHOD AND APPARATUS FOR AUTHENTICATING NODES IN A WIRELESS NETWORK

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

In general, solutions to the problems of authentication of network nodes and user devices in static networks have been widely researched, and several algorithms are described in the literature and implemented in practice. Similarly, the problems of authentication of network nodes and user devices in ad hoc networks without any centralized control or authentication database have also been researched in recent years. Disadvantageously, however, the existing solutions are either too complex or impractical and, further, are simply not applicable to a network architecture in which one or more of the nodes are assigned a special role of operating as an authentication server(s) for other nodes in the network.

SUMMARY OF THE INVENTION

Various deficiencies in the prior art are addressed through the invention of a method and apparatus for authenticating a wireless node requesting to join a wireless network. A method includes receiving an authentication request from the wireless node, negotiating at least one authentication parameter with the wireless node, deriving a first encryption key using the at least one authentication parameter, encrypting a second encryption key using the first encryption key, and propagating the encrypted second encryption key toward the wireless node, wherein the wireless node independently derives the first encryption key for use in decrypting the encrypted second encryption key received from the authentication server node. The wireless node decrypts the encrypted second encryption key and stores the second encryption key for use in securely communicating with other wireless nodes of the wireless network.

The present invention may be implemented using a modified version of one of the different Extensible Authentication Protocol (EAP) versions.

In one embodiment, the present invention may be implemented using a modified version of the EAP-TLS protocol, or some other EAP-based protocol, in which, rather than a Pairwise Master Key (PMK) being sent from the authentication server node to the wireless node, the authentication server node and wireless node each derive the PMK and the authentication server node securely provides a group encryption key to the wireless node by encrypting the group encryption key using the PMK. In this embodiment, secure distribution of the group encryption key(s) is possible because the wireless node includes access node (authenticator) capabilities and target node (supplicant) capabilities, i.e., the authenticator and supplicant are co-located within the wireless node.

In one embodiment, the present invention may be implemented using a modified version of EAP-TTLS or PEAP, or some other EAP-based protocol, in which a TLS tunnel is established between the authentication server node and the wireless node. In this embodiment, authentication of the wireless node and distribution of the group encryption key(s) occurs in a manner similar to an implementation that uses a modified version of the EAP-TLS protocol; however, EAP messages exchanged between the authentication server node and the wireless node are exchanged using the TLS tunnel. In this embodiment, similar to an EAP-TLS embodiment, secure distribution of the group encryption key is possible because the wireless node includes access node and target node capabilities.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context of a rapidly deployable wireless network (denoted herein as a 911 network on wheels, i.e., 911-NOW network); however, the present invention is applicable to various other networks. A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
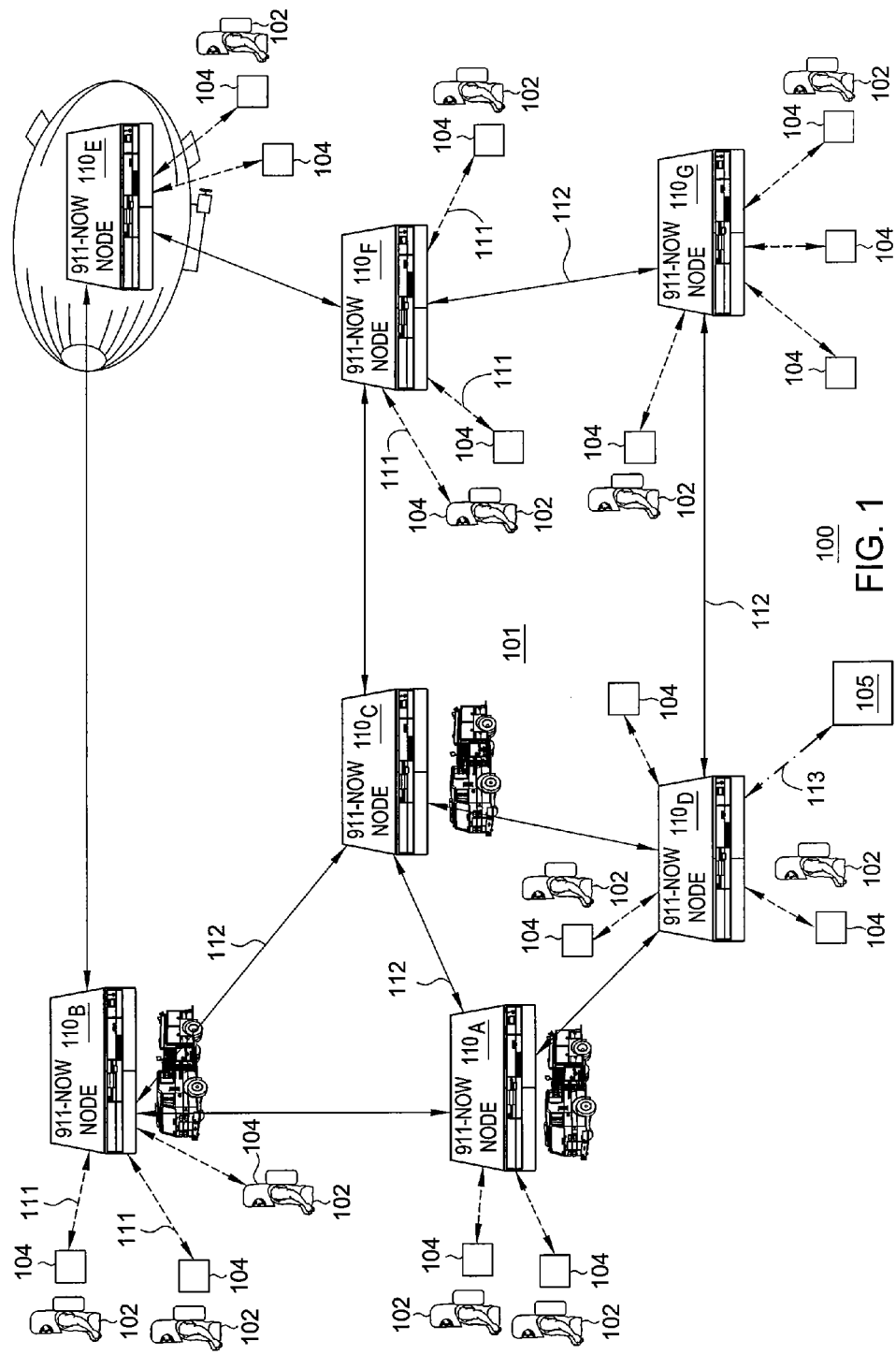
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes $110_A$-$110_G$ (collectively, 911-NOW nodes 110) supporting wireless communications at an emergency site 101. The standalone 911-NOW communication network architecture 100 provides a fully-functional network since each of the 911-NOW nodes 110 supports RAN functions, CORE networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, CORE networking functions, and various service functions, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node $110_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution-Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
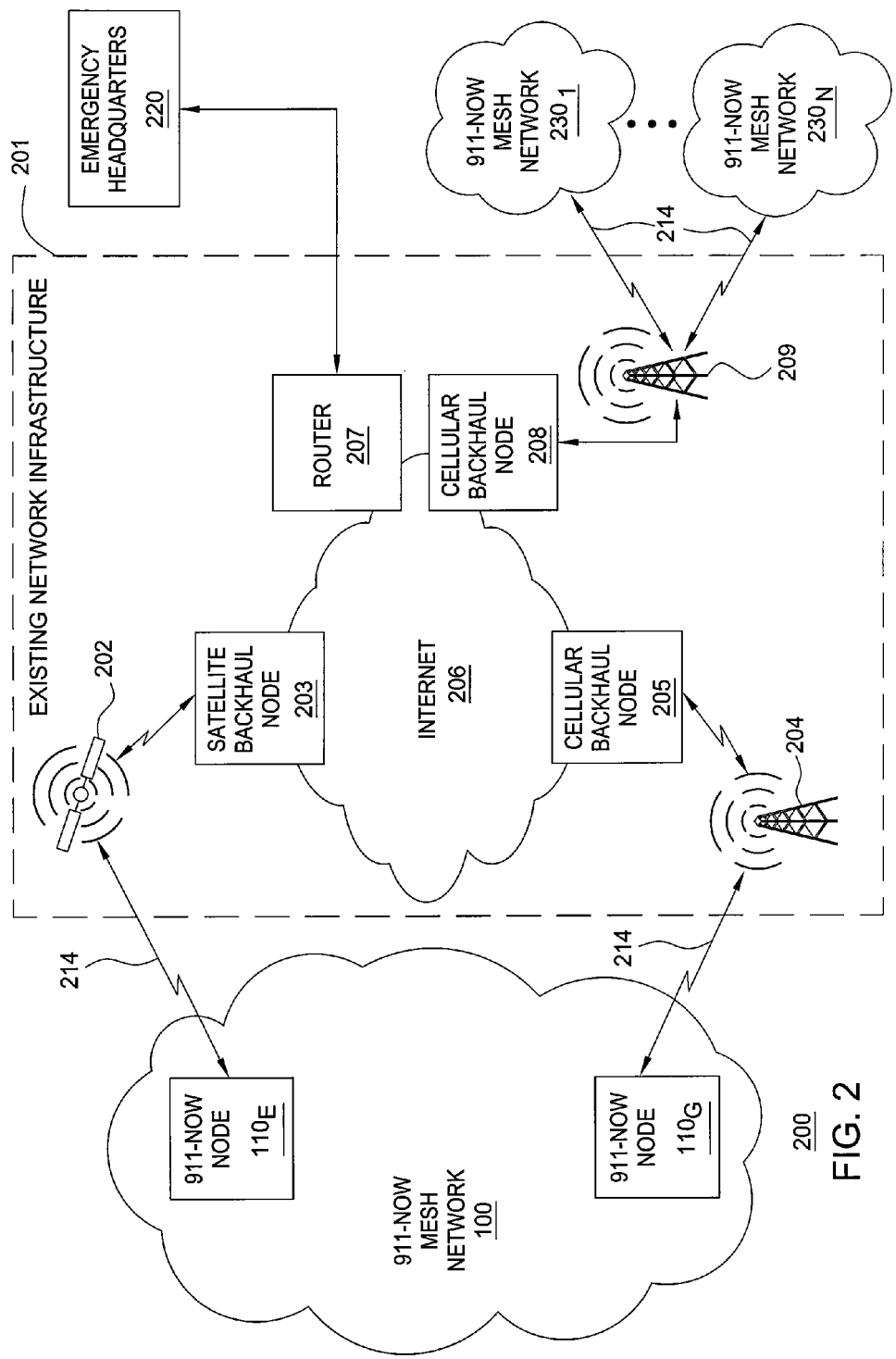
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node $110_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node $110_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks $230_1$-$230_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
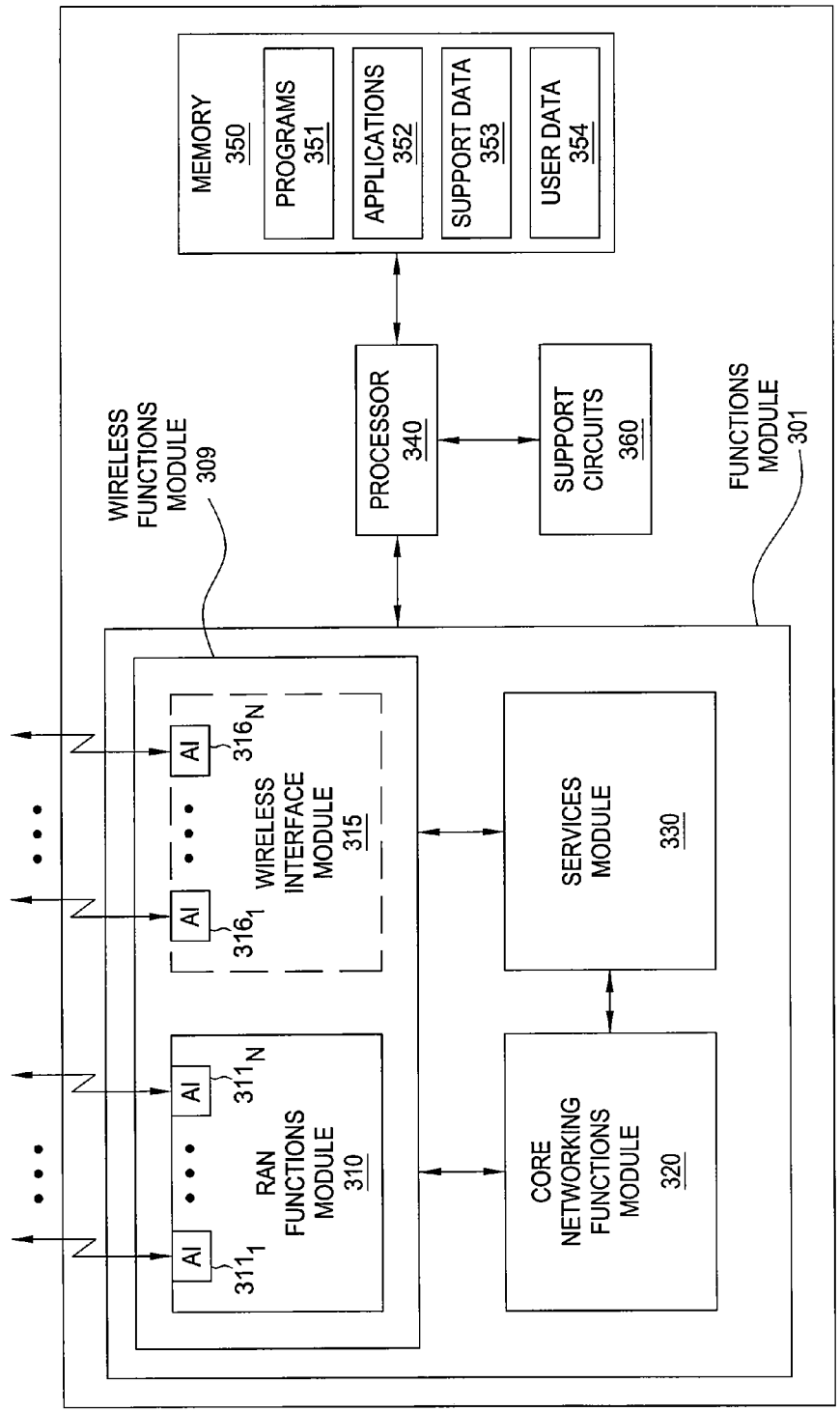
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information. The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AM) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

In emergency situations, emergency vehicles often arrive at and leave from emergency sites at different times, depending on the location from which the emergency vehicles are dispatched and the location of the emergency site. Furthermore, depending on the scope of the emergency, emergency vehicles from one or more neighboring jurisdictions may be dispatched to assist in responding the emergency. As a result, an emergency vehicle may arrive at an emergency site after a rapidly deployable wireless network has already been established at the emergency site (e.g., using rapidly deployable nodes placed on emergency vehicles already at the emergency site), as depicted and described with respect to FIG. 4.

Figure 4:
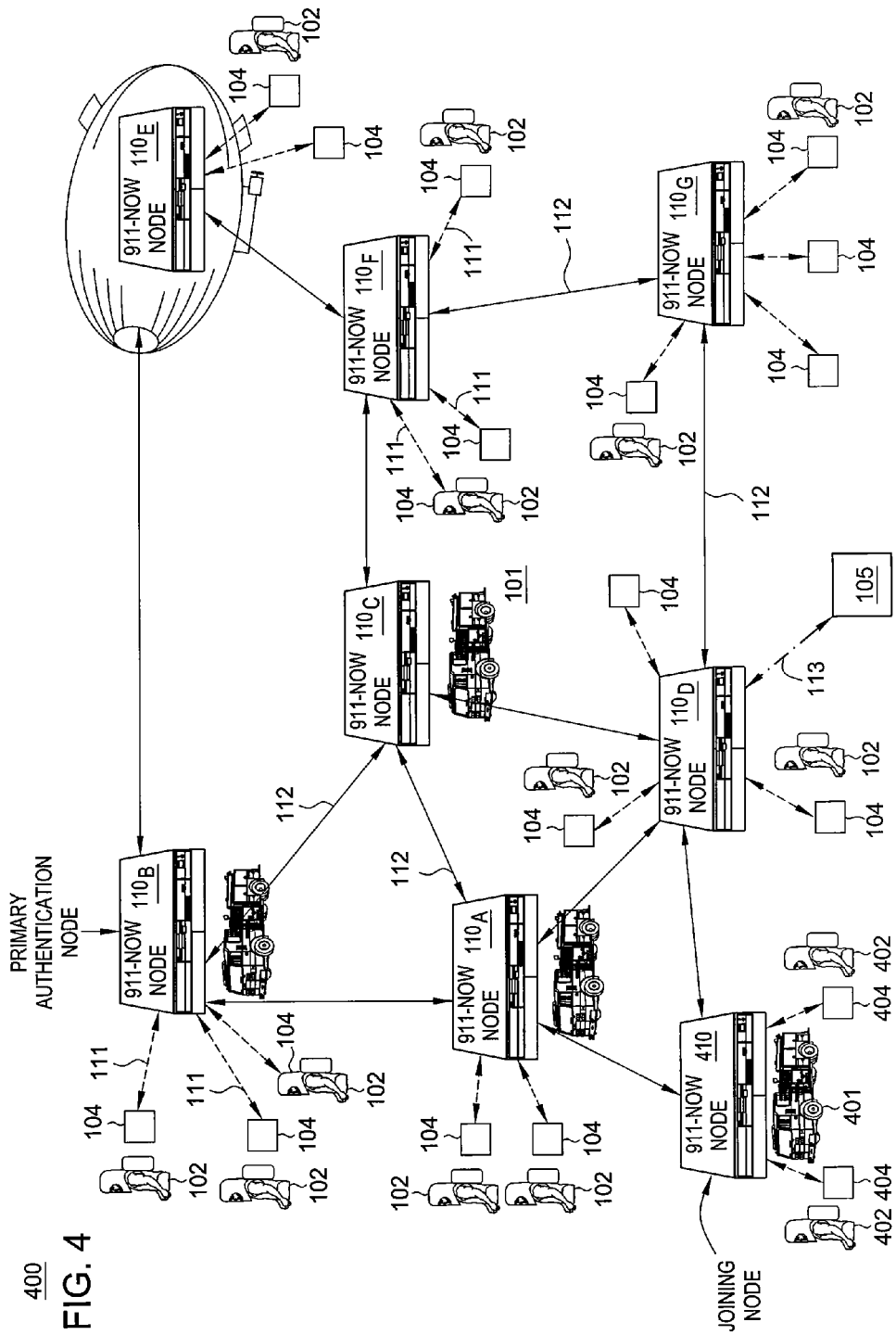
FIG. 4 depicts the 911-NOW communication network architecture of FIG. 3 in which an additional 911-NOW node arrives at the emergency site.

FIG. 4 depicts the 911-NOW communication network architecture of FIG. 1 in which a 911-NOW node arrives at the emergency site. Although primarily depicted and described within the context of a standalone wireless network (illustratively, standalone wireless network of FIG. 1), the present invention may also be used in an integrated wireless network (e.g., such as the integrated wireless network of FIG. 2). As depicted in FIG. 4, an emergency vehicle 401 (depicted as a fire truck) arrives at emergency site 101. The emergency vehicle 401 includes an additional 911-NOW node 410 (denoted herein as 911-NOW node 410) which, upon arriving at emergency site 101, has not yet associated with the 911-NOW communication network 100 which has already been established at emergency site 101 using 911-NOW nodes 110.

The emergency vehicle 401 transports emergency personnel 402 (i.e., users 402) to emergency site 101. The users 402 have user devices 404 by which the emergency personnel 402 intend to communicate with each other, as well as with other emergency personnel 102 at emergency site 101, and, optionally, with emergency headquarters 220 and/or one or more of the other 911-NOW mesh networks 230. The users 402 may initially communicate via 911-NOW node 410 and, further, as users 402 move about emergency site 101, via different ones of 911-NOW nodes 110. Before 911-NOW node 410 can join 911-NOW communication network 100 to support communications by users 102 and 402, the 911-NOW node 410 must be authenticated, and, further, must be provided with one or more encryption keys to enable the 911-NOW node 410 to securely receive/transmit information from other 911-NOW nodes 110 within 911-NOW communication network 100.

As depicted in FIG. 4, during establishment and configuration of 911-NOW communication network 100, one of 911-NOW nodes 110 (illustratively, 911-NOW node $110_B$) is configured as a primary authentication node. The primary authentication 911-NOW node $110_B$ performs node authentication functions, including node authentication negotiation functions and encryption key distribution functions. In one embodiment, primary authentication 911-NOW node $110_B$ may provide authorization, authentication, and accounting (AAA) functions typically provided by an AAA server in fixed wireless networks (e.g., where such AAA functions are supported as part of the CORE functions provided by 911-NOW nodes 110). The AAA functions may be supported by primary authentication 911-NOW node $110_B$ using RADIUS, DIAMETER, and like protocols adapted for use in secure exchange of messages required to perform node authentication negotiation functions, encryption key distribution functions, and like AAA-related functions.

The primary authentication node $110_B$ is responsible for authenticating 911-NOW nodes attempting to join 911-NOW communication network 100. The primary authentication node $110_B$ manages one or more encryption keys which primary authentication node $110_B$ must distribute to 911-NOW nodes after the 911-NOW nodes have been authenticated. The 911-NOW nodes 110 require the encryption keys in order to securely communicate with other 911-NOW nodes in the 911-NOW communication network 100. Namely, the 911-NOW nodes 110 use the encryption keys to encrypt information transmitted to other 911-NOW nodes 110 and to decrypt information received from other 911-NOW nodes 110. The encryption keys may include unicast encryption keys, multicast encryption keys, and/or broadcast encryption keys. Since an encryption key may be used by multiple 911-NOW nodes, the encryption keys used by 911-NOW nodes in 911-NOW communication network 100 may be referred to herein as group encryption keys (or, more generally, group keys).

Upon the arrival of additional 911-NOW node 410 at emergency site 101, until primary authentication node $110_B$ authenticates 911-NOW node 410 (including distributing an encryption key(s) to additional 911-NOW node 410), 911-NOW node 410 cannot access 911-NOW communication network 100 and, further, is unable to communicate with other 911-NOW nodes 110. In one embodiment, the present invention uses a variation of one of the Extensible Authentication Protocol (EAP) methods in order to perform node authentication functions, including node authentication negotiation and distribution of group encryption keys. An embodiment of an EAP-based architecture which may be used to implement node authentication functions of the present invention is depicted and described herein with respect to FIG. 5.

Figure 5:
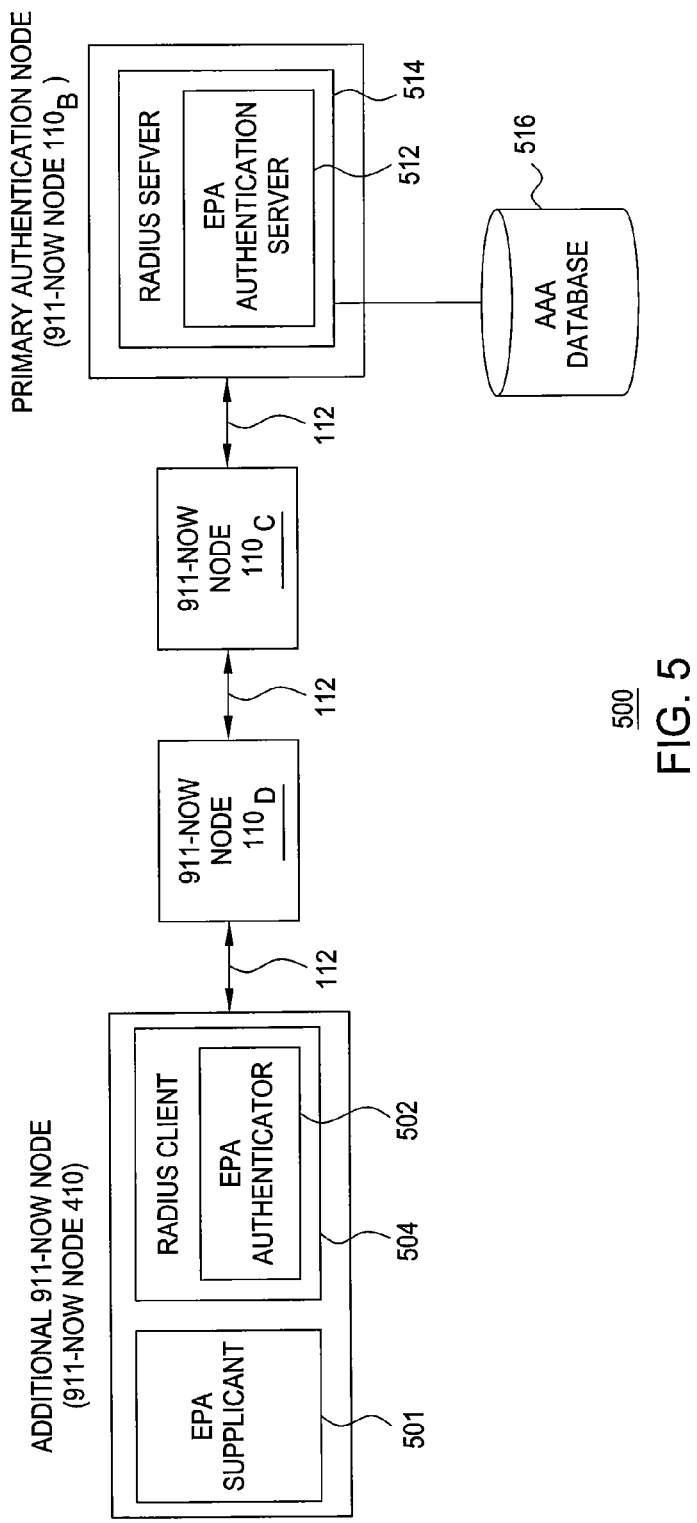
FIG. 5 depicts communication between the additional 911-NOW node and a primary 911-NOW node for authenticating the additional 911-NOW node and distributing encryption keys to the additional 911-NOW node.

FIG. 5 depicts communication between a 911-NOW node requesting to join a 911-NOW network (denoted as an additional 911-NOW node) and a 911-NOW node configured to operate as a primary authentication node 911-NOW node for the 911-NOW network (denoted as a primary authentication 911-NOW node). The interaction between the additional 911-NOW node and the primary authentication 911-NOW node is performed for authenticating the additional 911-NOW node, including distributing one or more encryption keys to the additional 911-NOW node. As depicted and described with respect to FIG. 4, the additional 911-NOW node is 911-NOW node 410 and the primary authentication 911-NOW node is 911-NOW node $110_B$.

As depicted in FIG. 5, 911-NOW node 410 and 911-NOW node $110_B$ exchange messages adapted to enable 911-NOW node $110_B$ to authenticate 911-NOW node 410, including negotiation of authentication parameters and distribution of one or more encryption keys from 911-NOW node $110_B$ to 911-NOW node 410. The 911-NOW node 410 and 911-NOW node $110_B$ exchange messages via intermediate 911-NOW nodes $110_D$ and $110_C$ using associated wireless mesh connections 112 (e.g., mesh hop IP links) between 911-NOW nodes. Specifically, 911-NOW node 410 communicates with 911-NOW node $110_D$, 911-NOW node $110_D$ communicates with 911-NOW node $110_C$, and 911-NOW node $110_C$ communicates with 911-NOW node $110_B$ using wireless mesh connections 112, respectively.

The 911-NOW node 410 and 911-NOW node $110_B$ communicate by exchanging messages using modified-EAP, i.e., using a modified version of one of the existing EAP methods. The EAP methods which may be modified to support the authentication functions of the present invention include certificate-based EAP methods (e.g., EAP-Transport Layer Security (EAP-TLS) and like EAP methods), certificate-based EAP methods that also utilize secure tunnels (e.g., using EAP-Tunneled Transport Layer Security (EAP-TTLS), Protected-EAP (PEAP), and like EAP methods), and the like. The modified-EAP method of the present invention is implemented using an EAP supplicant-authenticator model, in combination with a client-server-based protocol adapted for exchanging EAP authentication messages (e.g., the Remote Authentication Dial-In User Service (RADIUS) protocol, DIAMETER protocol, and like protocols).

As depicted in FIG. 5, 911-NOW node 410 includes an EAP supplicant 501 and an EAP authenticator 502 that is running on a RADIUS client 504, and 911-NOW node $110_B$ includes an EAP authenticator 512 running on a RADIUS server 514 which has an associated AAA database 516.

In existing implementations of EAP methods, the EAP supplicant and the EAP authenticator are not co-located (i.e., the EAP supplicant is an end user device such as a laptop and the EAP authenticator is an access node such as a WiFi hotspot node). Thus, in such existing implementations of EAP methods, the EAP authentication server and the EAP supplicant each derive the PMK independent from one another, and the EAP authentication server provides the PMK to the EAP authenticator such that the EAP authenticator and the EAP supplicant can communicate using the PMK (i.e., so that the end user laptop may securely communicate with the access node that includes the authenticator).

In an EAP-based implementation of the present invention, as depicted in FIG. 5, EAP supplicant 501 and an EAP authenticator 502 are co-located on 911-NOW node 410. In other words, 911-NOW node 410 includes EAP authenticator capabilities and EAP supplicant capabilities. Thus, since EAP supplicant 501 and EAP authenticator 502 and are co-located on 911-NOW node 410, EAP authenticator 502 of 911-NOW node 410 is able to obtain a PMK independent of EAP authentication server 512 (because EAP supplicant 501 is able to derive the PMK independent of EAP authentication server 512 and provide the PMK to EAP authenticator 502 internally).

The EAP supplicant 501 and EAP authenticator 502 exchange EAP messages using internal messaging (rather than using WiFi or some other wireless protocol, as is required in existing implementations of EAP methods in which the EAP supplicant and EAP authenticator are not co-located within the same node). In other words, since the EAP supplicant 501 and the EAP authenticator 502 are co-located within 911-NOW node 410, 911-NOW node 410 supports internal EAP-based messaging between EAP supplicant 501 and EAP authenticator 502. The internal EAP-based messaging between EAP supplicant 501 and EAP authenticator 502 may be implemented using any means for internal communication of EAP messages.

The EAP authenticator 502 and EAP authentication server 512 exchange EAP messages using the RADIUS protocol. Specifically, EAP authenticator 502 and EAP authentication server 512 exchange EAP messages using RADIUS messaging between RADIUS client 504 of 911-NOW node 410 and RADIUS server 514 of 911-NOW node 110$_B$. Although primarily depicted and described with respect to using RADIUS to support EAP messaging between EAP authenticator 502 and EAP authentication server 512, a protocol(s) other than RADIUS may be used to support such EAP messaging (e.g., using DIAMETER or like authentication protocols). In such embodiments, RADIUS client 504 and RADIUS server 514 may be replaced by comparable client/server software for the message exchange protocol that is used to exchange EAP messages.

The EAP supplicant 501 on 911-NOW node 410 is adapted to perform some of the standard EAP functions, as well as additional authentication functions of the present invention. For example, while EAP supplicant 501 still derives the PMK; rather than using the PMK in order to securely communicate with an access node, EAP supplicant 501 provides the derived PMK to EAP authenticator 502, using internal messaging, for use by EAP authenticator 502 in decrypting group encryption keys provided from the EAP authentication server of 911-NOW node 110$_B$ to the EAP authenticator 502 911-NOW node 410.

The EAP authenticator 502 on 911-NOW node 410 is adapted to perform some standard EAP functions, as well as additional authentication functions of the present invention. For example, while EAP authenticator 502 still communicates with EAP authentication server 512; rather than receiving the PMK from the EAP authentication server 512 and using the PMK in order to securely communicate with end user devices, EAP authenticator uses the PMK received internally from the EAP supplicant 501 in order decrypt group encryption keys provided from the EAP authentication server of 911-NOW node 110$_B$ to the EAP authenticator 502 911-NOW node 410.

The EAP authentication server 512 on 911-NOW node 410 is adapted for performing some of the standard EAP authentication functions, as well as additional authentication functions of the present invention. In other words, EAP authentication server 512 is a modified version of existing EAP authentication server defined in EAP standards. For example, in addition to performing standard authentication parameter negotiation functions, EAP authentication server 512 encrypts group encryption keys using a derived PMK and provides the encrypted group encryption key to EAP authenticator 502 of additional 911-NOW node 410 (rather than providing the PMK to an EAP authenticator for use by that EAP authenticator in authenticating a remote EAP supplicant, i.e., for authenticating an end user device), maintains an association between the PMK and the additional authentication node 410 for later distributions of group encryption key(s) to additional 911-NOW node 410 using the associated PMK, and performs like functions, as well as various combinations thereof.

Figure 6A:
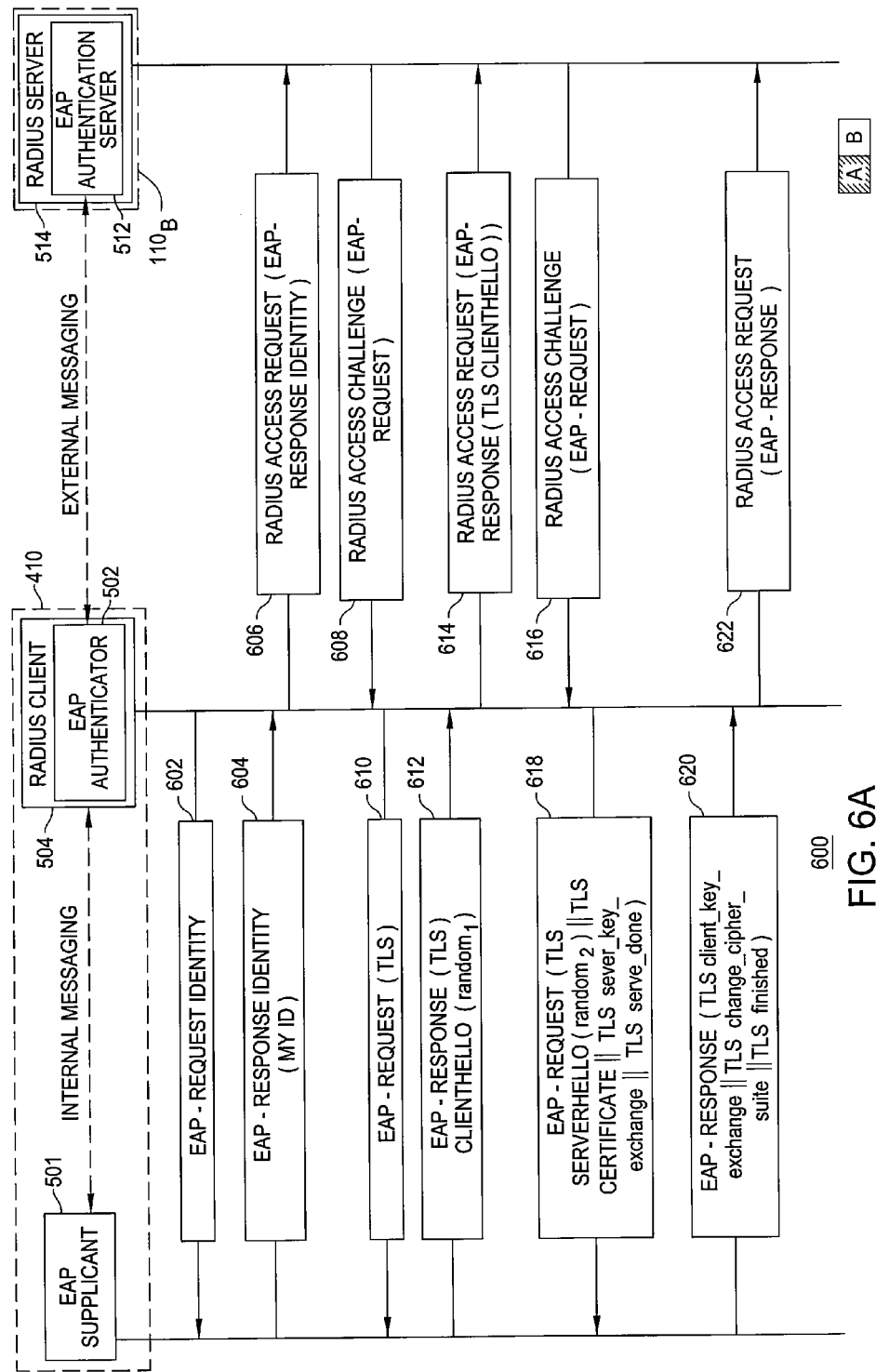
FIG. 6 depicts a method according to one embodiment of the present invention.
Figure 6B:
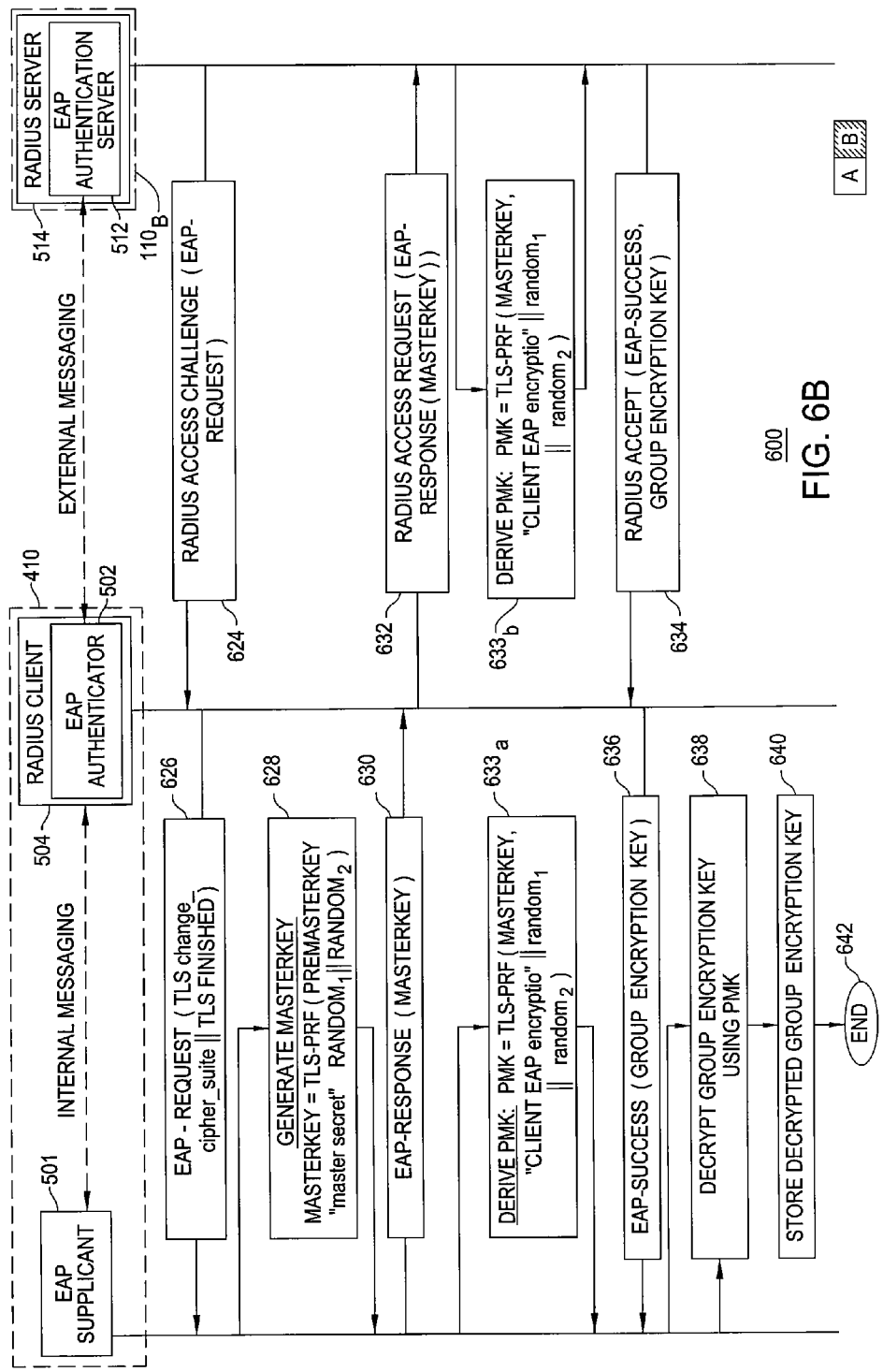

A method for authentication of a 911-NOW node in a 911-NOW-based network using a modified version of EAP-TLS, where EAP messages are exchanged using RADIUS, is depicted and described herein with respect to FIG. 6. Although primarily depicted and described herein with respect to an embodiment using EAP-TLS and RADIUS, the present invention may be implemented to provide node authentication functions using various other EAP schemes and associated EAP message exchange protocols. Thus, since node authentication functions of the present invention may be implemented using various different EAP schemes and associated EAP message exchange protocols, a generic method for authentication of a 911-NOW node in a 911-NOW-based network is depicted and described herein with respect to FIG. 7.

FIG. 6 depicts a method according to one embodiment of the present invention. Specifically, method 600 of FIG. 6 includes a method by which a primary authentication node of a wireless network authenticates a wireless node attempting to join the wireless network (and is depicted and described within the context of an embodiment in which a modified version of the EAP-TLS authentication process is used and RADIUS is used for exchanging authentication messages). Although primarily depicted and described herein as being performed serially, at least a portion of the steps of method 600 of FIG. 6 may be performed contemporaneously, or in a different order than depicted and described with respect to FIG. 6.

As depicted in FIG. 6, and depicted and described herein with respect to FIG. 5, EAP supplicant 501 and EAP authenticator 502 of 911-NOW node 410 communicate using internal messaging within 911-NOW node 410, and, further, EAP authenticator 502 (via RADIUS client 504) of 911-NOW node 410 communicates with EAP authentication server 512 (via RADIUS server 514) of 911-NOW node 110$_B$ using external messaging (e.g., using IP mesh hops). Although omitted from FIG. 6 for purposes of clarity, 911-NOW node 410 may announce its presence (e.g., using a presence notification message, access request message, or similar message) to 911-NOW node $110_B$ before initiating the node authentication process depicted and described with respect to FIG. 6.

At step 602, EAP authenticator 502 begins by providing an EAP-Request Identity message to EAP supplicant 501. At step 604, EAP supplicant 501 responds to the EAP-Request Identity message by providing an EAP-Response Identity message (which may include an identifier of the EAP supplicants 501) to EAP authenticator 502. At step 606, EAP authenticator 502 transmits the EAP-Response Identity message from EAP supplicant 501 to EAP authentication server 512 using a RADIUS Access Request message (i.e., as a RADIUS Access Request (EAP-Response Identity) message). After EAP authentication server 512 receives the EAP-Response Identity message, EAP authentication server 512 initiates one or more rounds of authentication parameter negotiation with EAP supplicant 501 in order to fully authenticate 911-NOW node 410, including distribution of one or more group encryption keys to 911-NOW node 410).

At step 608, EAP authentication server 512 transmits a RADIUS Access Challenge message (including an EAP-Request message) to EAP authenticator 502. At step 610, EAP authenticator 502 forwards the EAP-Request message (received in the RADIUS message from EAP authentication server 512) to EAP supplicant 501 as an EAP-Request message (which may indicate the type of EAP method used, illustratively, EAP-TLS). At step 612, EAP supplicant 501 responds to the EAP-Request Identity message by providing an EAP-Response message to EAP authenticator 502. The EAP-Response message includes one or more authentication parameters (e.g., an EAP-Response (TLS ClientHello (random$_1$)) message). At step 614, EAP authenticator 502 transmits the EAP-Response message from EAP supplicant 501 to EAP authentication server 512 using a RADIUS Access Request message (i.e., as a RADIUS Access Request (EAP-Response (TLS ClientHello)) message).

At step 616, EAP authentication server 512 transmits a RADIUS Access Challenge message (including an EAP-Request message) to EAP authenticator 502. At step 618, EAP authenticator 502 forwards the EAP-Request message (received in the RADIUS message from EAP authentication server 512) to EAP supplicant 501 as an EAP-Request message. The EAP-Request message (which may indicate the type of EAP method used) includes one or more authentication parameters (e.g., TLS ServerHello (random$_2$), TLS Certificate, TLS server_key_exchange, and TLS server_done). At step 620, EAP supplicant 501 responds to the EAP-Request message by providing an EAP-Response message to EAP authenticator 502. The EAP-Response message includes one or more authentication parameters (e.g., TLS client_key_exchange, TLS change_cipher_suite, and TLS finished). At step 622, EAP authenticator 502 transmits the EAP-Response message from EAP supplicant 501 to EAP authentication server 512 using a RADIUS Access Request message (i.e., as a RADIUS Access Request (EAP-Response) message).

At step 624, EAP authentication server 512 transmits a RADIUS Access Challenge message (including an EAP-Request message) to EAP authenticator 502. At step 626, EAP authenticator 502 forwards the EAP-Request message (received in the RADIUS message from EAP authenticator 512) to EAP supplicant 501 as an EAP-Request message. The EAP-Request message includes one or more authentication parameters (e.g., TLS change_cipher_suite and TLS finished). Upon receiving the EAP-Request message including a "TLS finished" indicator from EAP authentication server 512 (via EAP authenticator 502), EAP supplicant 501 knows that the TLS handshake between EAP supplicant 501 and EAP authentication server 512 is complete and, thus, EAP supplicant 501 has sufficient information obtained during the TLS handshake such that EAP supplicant 501 can derive a master key (denoted as MASTERKEY) and provide the derived master key to EAP authentication server 512.

At step 628, the EAP supplicant 501 derives the master key. The EAP supplicant 501 derives the master key using a pseudorandom function (PRF) which takes as input a PREMASTERKEY, the "master secret" negotiated during the TLS handshake, a first random number (e.g., random$_1$ sent from EAP supplicant 501 to EAP authenticator 502 in step 612), and a second random number (e.g., random$_2$ sent from EAP authenticator 502 to EAP supplicant 501 in step 618). At step 630, EAP supplicant 501 provides an EAP-Response message to EAP authenticator 502. The EAP-Response message includes the MASTERKEY computed by EAP supplicant 501. At step 632, EAP authenticator 502 forwards the EAP-Response message received from EAP supplicant 501 to EAP authentication server 512 as a RADIUS Access Request message including the MASTERKEY (i.e., as a RADIUS Access Request (EAP-Response) (MASTERKEY) message).

At step $633_A$, EAP supplicant 501 derives a Pairwise Master Key (PMK) independent of EAP authentication server 512 (i.e., such that EAP authentication server 512 does not have to provide the PMK to the EAP supplicant 501). Thus, since EAP supplicant 501 and EAP authenticator 502 are co-located within 911-NOW node 410, EAP authentication 502 is able to obtain the PMK from EAP supplicant 501 internally (and, thus, securely), and does not rely on EAP authentication server 512 to send the PMK. At step $633_Z$, EAP authentication server 512 derives a Pairwise Master Key (PMK) independent of EAP supplicant 501.

In one embodiment, EAP supplicant 501 and EAP authentication server 512 each derive the PMK using a pseudorandom function (PRF) which takes as input at least a portion of the authentication parameters negotiated by EAP supplicant 501 and EAP authentication server 512. In one such embodiment, for example, EAP supplicant 501 and EAP authentication server 512 each derive the PMK using a PRF which takes as input a MASTERKEY, the "client EAP encryption" parameter negotiated during the TLS handshake, the first random number (e.g., random$_1$ sent from EAP supplicant 501 to EAP authenticator 502 in step 612), and the second random number (e.g., random$_2$ sent from EAP authenticator 502 to EAP supplicant 501 in step 618). Although depicted and described with respect to using specific parameters to derive the PMK, fewer or more parameters, as well as different parameters, may be used.

At step 634, EAP authentication server 512 transmits a RADIUS ACCEPT message (including an EAP-Success message) to EAP authenticator 502. The EAP-Success message includes a group encryption key, which is encrypted by EAP authentication server 512 using the PMK. Thus, the EAP-based node authentication process of the present invention is different than existing EAP-based implementations in that, in embodiments of the present invention, EAP authentication server 512 includes a group encryption key in the RADIUS ACCEPT message intended for EAP supplicant 501 (rather than including the PMK in the RADIUS ACCEPT message).

In other words, since EAP supplicant 501 is able to derive the PMK and, further, is co-located with EAP authenticator 502 in 911-NOW node 410, EAP authenticator 502 is able to obtain the PMK locally from EAP supplicant 501 using internal messaging (rather than having to receive the PMK in the RADIUS ACCEPT message from EAP authentication server 512). Thus, since EAP authenticator 502 is able to obtain the PMK locally from co-located EAP supplicant 501, EAP authentication server 512 invention is able to use the PMK to securely transmit a group encryption key to 911-NOW node 410 by encrypting the group encryption key using the PMK.

At step 636, the EAP authenticator 502 forwards the EAP-Success message (received in the RADIUS message from EAP authentication server 512) to EAP supplicant 501 as an EAP-Success message. The EAP-Success message includes the encrypted group encryption key (which is encrypted using the PMK). As such, although the EAP-Success message received at EAP supplicant 501 does not include the PMK (whereas, in existing EAP implementations the EAP-Success message does include the PMK and not a different key), since EAP supplicant 501 derived the PMK, co-located EAP authenticator 502 is able to decrypt the encrypted group encryption key received in the EAP-Success message.

At step 638, EAP supplicant 501 decrypts the group encryption key. The EAP supplicant 501 decrypts the encrypted group encryption key using the PMK derived at EAP supplicant 501. At step 640, EAP supplicant 501 stores the decrypted group encryption key. At step 642, method 600 ends. At this point, 911-NOW node 410 has been authenticated, and, further, has been securely provided with the group encryption key which 911-NOW node 410 can use to securely communicate with one or more other 911-NOW nodes 110 that form the 911-NOW network. Specifically, 911-NOW node 410 can use the group encryption key to encrypt messages that are intended for other 911-NOW nodes 110, and can use the group encryption key to decrypt messages that are received from other 911-NOW nodes 110.

Figure 7:
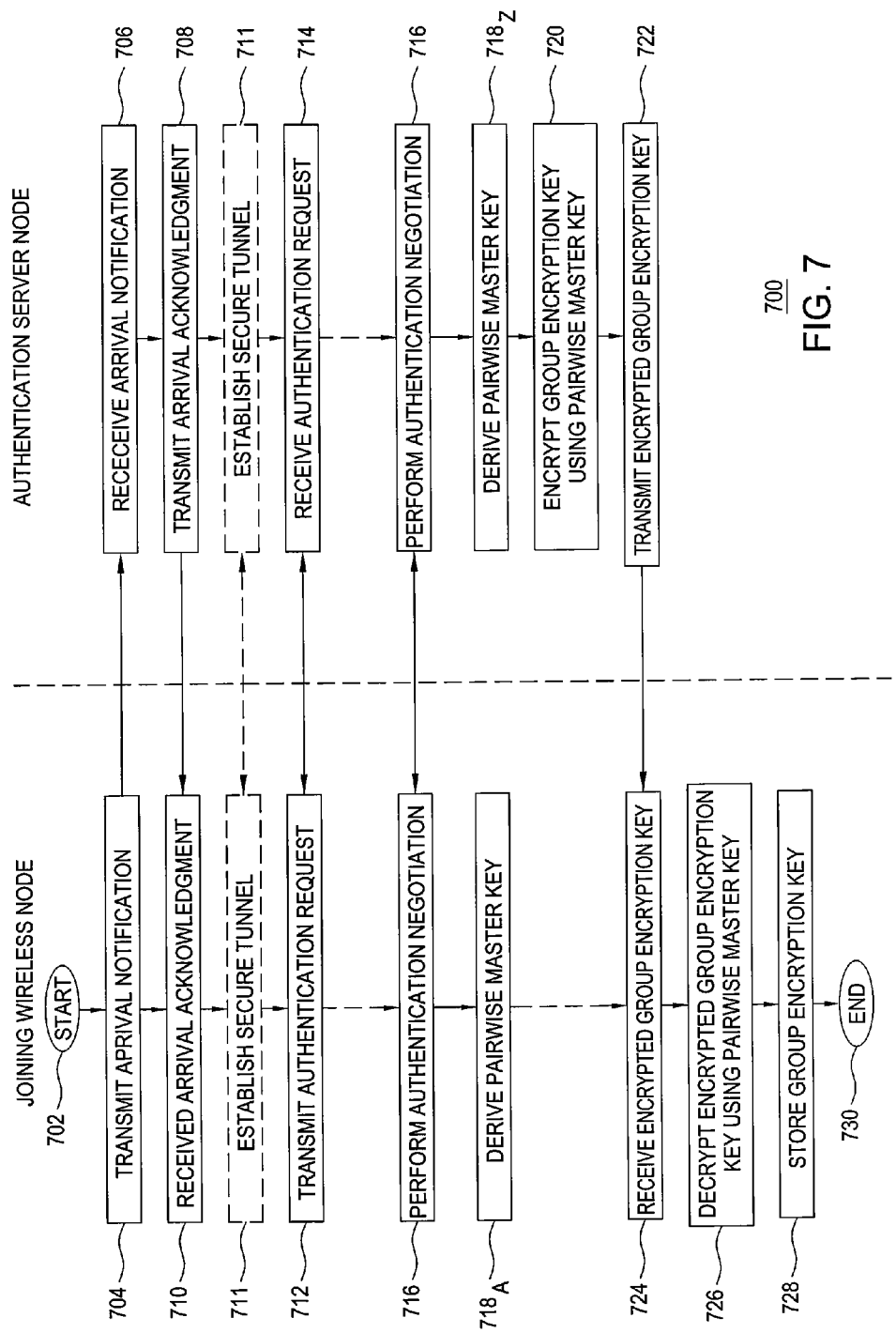
FIG. 7 depicts a method according to one embodiment of the present invention in which the EAP-TTL protocol is modified according to the present invention.

FIG. 7 depicts a method according to one embodiment of the present invention. Specifically, method 700 of FIG. 7 includes a method by which an authentication server node of a wireless network authenticates a wireless node that is attempting to join the wireless network. In one embodiment, the authentication server node is the EAP authentication node 512 of FIG. 5 and FIG. 6 and the wireless node that is attempting to join the wireless network is the 911-NOW node 410 which includes an EAP authenticator 502 and an EAP supplicant 501 of FIG. 5 and FIG. 6. In other words, the joining wireless node is a wireless node which includes access node capabilities and target node (i.e., supplicant) capabilities.

Thus, method 700 of FIG. 7 is a more general version of method 600 of FIG. 6 (i.e., protocols by which messages are exchanged are not specified because, as described herein, many different combinations of protocols may be used to implement the node authentication functions of the present invention). Although primarily depicted and described herein as being performed serially, at least a portion of the steps of method 700 of FIG. 7 may be performed contemporaneously, or in a different order than depicted and described with respect to FIG. 7. The method 700 begins at step 702 and proceeds to step 704.

At step 704, the joining wireless node (i.e., the wireless node which desires to authenticate with and join the existing network) transmits an arrival notification to the authentication server node (i.e., the node that is responsible for authenticating nodes attempting to join the network). At step 706, the authentication server node receives the arrival notification from the joining wireless node. At step 708, the authentication server node transmits an arrival acknowledgment to the joining wireless node. At step 710, the joining wireless node receives the arrival acknowledgment from the authentication server node.

At step 711, the joining wireless node and the authentication server node may, optionally, establish a secure tunnel before information (e.g., such as authentication parameters) is exchanged between the joining wireless node and the authentication server node for authenticating the joining wireless node. In one embodiment, the determination as to whether or not a secure tunnel is established before any information is exchanged between the joining wireless node and the authentication server node may depend on the type of EAP protocol upon which the implementation of the present invention is based. For example, where the present invention is implemented using a modified version of EAP-TLS, a secure tunnel is not established; however, where the present invention is implemented using a modified version of EAP-TTLS, PEAP, or another type of EAP which uses tunneling, a secure tunnel is established.

In one embodiment, in which the present invention is implemented using a modified version of EAP-TTLS, the authentication server node may include a TTLS server such that a TLS tunnel is established between the joining wireless node and the TTLS server, and then EAP exchanges are run over the TLS tunnel. In another embodiment, in which the present invention is implemented using a modified version of PEAP, the authentication server node may include a PEAP server such that a TLS tunnel is established between the joining wireless node and the PEAP server, and then EAP exchanges are run over the TLS tunnel. Although primarily depicted and described herein with respect to using modified versions of EAP-TTLS or PEAP tunneling, various other types of tunneling may be used.

With respect to method 700, if a secure tunnel is not established between the joining wireless node and the authentication server node, the remaining steps by which the joining wireless node is authenticated (in which information is exchanged between the joining wireless node and the authentication server node) are performed using any means of exchanging such information. Similarly, with respect to method 700, if a secure tunnel is established between the joining wireless node and the authentication server node, the remaining steps by which the joining wireless node is authenticated (in which information is exchanged between the joining wireless node and the authentication server node) are performed using the secure tunnel.

At step 712, the joining wireless node transmits an authentication request to the authentication node. At step 714, the authentication node receives the authentication request from the joining wireless node. At step 716, the joining wireless node and authentication server node perform authentication negotiations, whereby the joining wireless node and the authentication server node exchange messages in order to negotiate authentication parameters. For example, where the present invention is implemented as a modified version of EAP-TLS, the joining wireless node and the authentication server node may exchange EAP-Request and EAP-Response messages in order to negotiate, and ultimately agree upon, authentication parameters (e.g., in order to negotiate authentication parameters such as $random_1$, $random_2$, TLS server_key_exchange, TLS change_cipher_suite, and like authentication parameters, as depicted and described with respect to steps 608-626 of FIG. 6).

From step 716 the joining wireless node proceeds to step $718_A$ and the authentication server node proceeds to step $718_Z$, such that both the joining wireless node and the authentication server node each derive a Pairwise Master Key (PMK). At step $718_A$, the joining wireless node derives a Pairwise Master Key (PMK). At step $718_Z$, the authentication server node derives a Pairwise Master Key (PMK). The joining wireless node and the authentication server node each derive the PMK using at least a portion of the authentication parameters negotiated with the authentication node. As such, since the joining wireless node is able to derive the PMK (rather than having to wait for the authentication server node to send the PMK), the authentication server node is not required to provide the PMK to the joining wireless node and, further, the authentication server node can actually use the PMK in order to securely send one or more other encryption keys to the joining wireless node. From step $718_Z$, the authentication server node proceeds to step 720.

At step 720, the authentication server node encrypts a group encryption key using the PMK. At step 722, the authentication server node transmits the encrypted group encryption key to the joining wireless node. At step 724, the joining wireless node receives the encrypted group encryption key from the authentication server node (i.e., from step $718_A$, the joining wireless node waits to receive the encrypted group encryption key from the authentication server node (at step 724)). At step 726, the joining wireless node decrypts the encrypted group encryption key using the PMK that was independently derived by the joining wireless node. At step 728, the joining wireless node stores the group encryption key which the joining wireless node may then use to securely communicate with other nodes of the network. At step 728, method 700 ends.

Although depicted and described herein with respect to embodiments in which the authentication server node provides one group encryption key to the joining wireless node, in some embodiments of the present invention multiple group encryption keys may be provided from the authentication server node to the joining wireless node. In such embodiments, the group encryption keys may include any combination of unicast encryption keys, multicast encryption keys, and/or broadcast encryption keys.

As described herein, after the joining wireless node is authenticated by the authentication server node and joins the wireless network, and receives and stores the one or more group encryption keys, that wireless node may use the group encryption key(s) to securely communicate with other wireless nodes of the network. In one embodiment, for example, the wireless nodes may communicate using WiFi, thereby forming a mesh network of wireless nodes.

In one embodiment, for example, the wireless node, upon receiving a packet from a wireless user device served by the wireless node, may retrieve one of the stored group encryption keys from memory, encrypt the received packet using the group encryption key, and transmit the encrypted packet toward one ore more other wireless nodes (i.e., in order to propagate the encrypted packet to one or more wireless nodes serving one or more other wireless user devices for which the packet is intended).

For example, where the received packet is intended for one other wireless user device, the wireless node may encrypt the received packet using a unicast encryption key. Similarly, for example, where the received packet is intended for a subset of other wireless user devices, the wireless node may encrypt the received packet using a multicast encryption key. Similarly, for example, where the received packet is intended for all other wireless user devices in the network, the wireless node may encrypt the received packet using a broadcast encryption key.

In one embodiment, for example, the wireless node, upon receiving a packet from another wireless node, may identify one of the group encryption keys needed to decrypt the packet, retrieve the identified one of the group encryption keys from memory, decrypt the encrypted packet using the retrieved group encryption key, and transmit the decrypted packet toward a wireless user device(s) for which the packet is intended. In embodiments in which multiple group encryption keys are stored on the wireless node, the wireless node may identify the one of the group encryption keys needed to decrypt the packet in any manner.

Although primarily depicted and described herein with respect to embodiments in which one of the wireless nodes in the wireless network (a wireless node configured as a primary authentication node for the wireless network) performs the authentication functions of the present invention, in other embodiments the authentication functions of the present invention may be performed by a different element, or distributed across multiple network elements. For example, such network elements may include a designated authentication server node that is part of the mesh wireless network (e.g., rather than an implementation in which one of the wireless nodes supporting user traffic is also responsible for providing the authentication functions), a designated authentication node that is part of existing network infrastructure (e.g., an AAA server in the existing core network), a management system, and the like, as well as various combinations thereof.

Although primarily depicted and described herein with respect to the initial authentication of a wireless node, and the initial distribution of one or more group encryption keys to the authenticated wireless node, since the list of group encryption keys that are valid for the network may change over time the present invention may also be used to distribute updated group encryption keys to existing wireless nodes of the wireless network. A method according to one embodiment for distributing an updated group encryption key within an existing wireless network is depicted and described with respect to FIG. 8.

Figure 8:
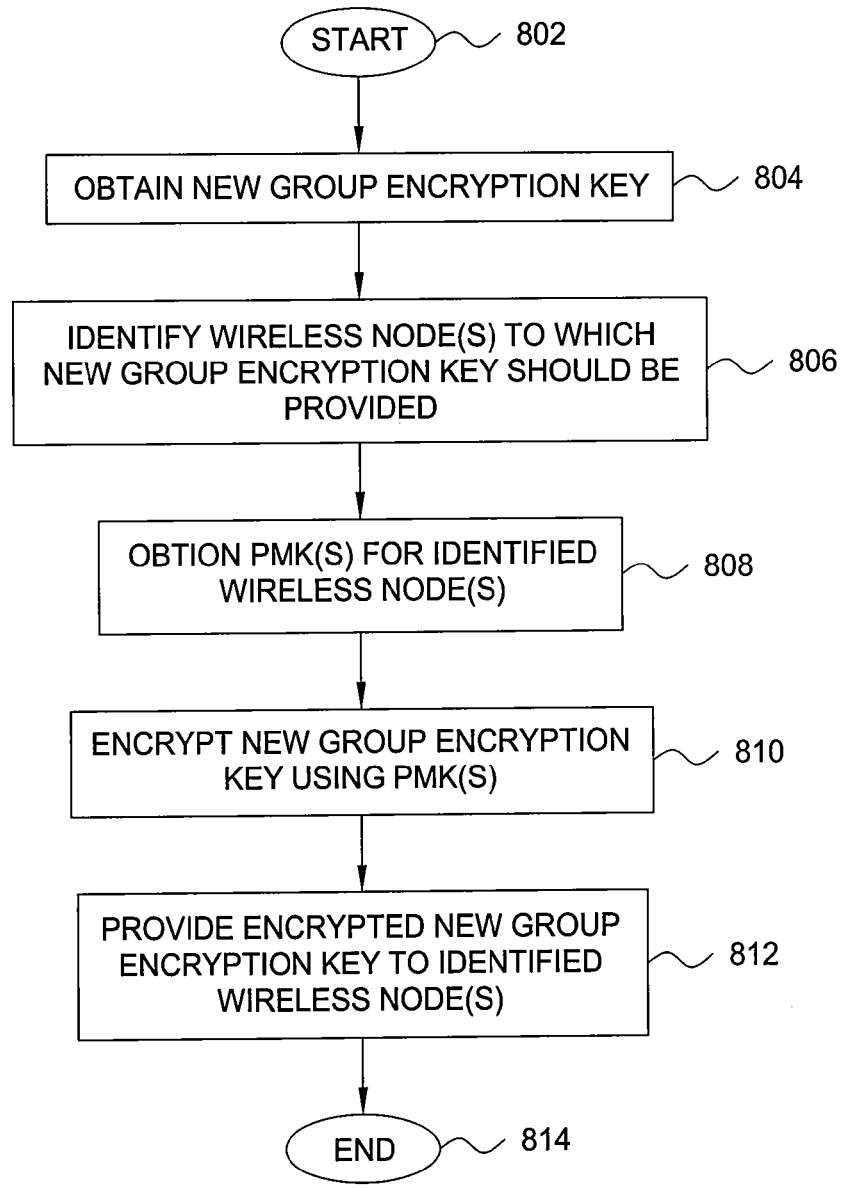
FIG. 8 depicts a method according to one embodiment of the present invention.

FIG. 8 depicts a method according to one embodiment of the present invention. Specifically, method 800 of FIG. 8 includes a method by which an authentication server node of a wireless network distributes an updated group encryption key to one or more wireless nodes of the wireless network. The use of new group encryption keys in the wireless network increases the security of communications between wireless user devices of the wireless network. Although primarily depicted and described herein as being performed serially, at least a portion of the steps of method 800 of FIG. 8 may be performed contemporaneously, or in a different order than depicted and described with respect to FIG. 8. The method begins at step 802 and proceeds to step 804.

At step 804, the authentication server node obtains a new group encryption key. In one embodiment, the authentication server node may derive the new group encryption key. In another embodiment, the authentication server node may receive the new group encryption key (e.g., where the new group encryption key is derived by a different network element and provided to the authentication server node). The new group encryption key may be a new group encryption key or a replacement group encryption key (i.e., intended to replace an existing group encryption key(s)).

In such embodiments, new group encryption keys may be derived in any manner and for any reason. For example, the new group encryption key may be derived periodically, in response to an event or condition, and the like, as well as various combinations thereof. In one embodiment, for example, in which new group encryption keys are derived periodically, each group encryption key may have an associated parameter(s) indicative of the length of time for which the group encryption key will be valid (e.g., using timers, expiration times, and the like), such that the network element responsible for deriving the new group encryption key knows when a new group encryption key needs to be derived and distributed.

At step 806, the authentication server node identifies the wireless nodes that should receive the new group encryption key. In one embodiment, for each group encryption key, the authentication server node may maintain a mapping of the group encryption key to each wireless node(s) that stores and uses that group encryption key. In this embodiment, where the new group encryption key replaces an existing group encryption key, the authentication server node may identify the wireless node(s) that should receive the new group encryption key using this mapping between group encryption keys and wireless nodes. This mapping may be updated each time a new wireless node joins the network, as well as whenever new group encryption keys are derived and distributed to wireless nodes.

The number of wireless nodes associated with a group encryption key (and, thus, identified by the authentication server node) depends on whether the group encryption key is a unicast group encryption key, a multicast group encryption key, or broadcast group encryption key. For example, for a unicast group encryption key or a multicast group encryption key, some or all of the wireless nodes in the wireless network may be identified as wireless nodes that should receive the new group encryption key. For example, for a broadcast group encryption key, all of the wireless nodes in the wireless network may be identified as wireless nodes that should receive the new group encryption key.

At step 808, the authentication server node obtains PMK(s) for the identified wireless nodes. In one embodiment, the authentication server node maintains a mapping between each wireless node in the network and the associated PMK that was derived for that wireless node at the time that the wireless node joined the network (e.g., using method 700 depicted and described with respect to FIG. 7). In one such embodiment, in which the authentication server node maintains a mapping between each group encryption key and the wireless node(s) that stores and uses that group encryption key, the mapping may also include the PMK information (i.e., including the PMK derived for each wireless node).

At step 810, the authentication server node encrypts the new group encryption key using the obtained PMK(s). If there is only one wireless node to which the new group encryption key must be transmitted, only one copy of the new group encryption key (and the message used to deliver it) is needed; however, where there are multiple wireless nodes to which the new group encryption key must be transmitted, multiple copies of the new group encryption key may be created such that the different copies may be encrypted using the different PMKs associated with the different wireless nodes.

At step 812, the authentication server node provides the new group encryption key to the identified wireless node(s). As described herein, upon receiving a new group encryption key, the wireless node that receives the encrypted group encryption key decrypts the new group encryption key using the PMK, and stores the decrypted new group encryption key for use in communicating with other wireless nodes of the network. At step 814, method 800 ends.

For example, where three different wireless nodes (node1, node2, and node3) are identified, and have three different PMKs (e.g., PMK1, PMK2, and PMK3, respectively), three different copies of the new group encryption key need to be created by the authentication server node (i.e., a first copy encrypted using PMK1, a second copy encrypted using PMK2, and a third copy encrypted using PMK3). In this example, the authentication server node provides the different encrypted copies of the new group encryption key to the identified wireless nodes (i.e., the authentication node provides the first copy encrypted using PMK1 to node1, provides the second copy encrypted using PMK2 to node2, and provides the third copy encrypted using PMK3 to node3).

Figure 9:
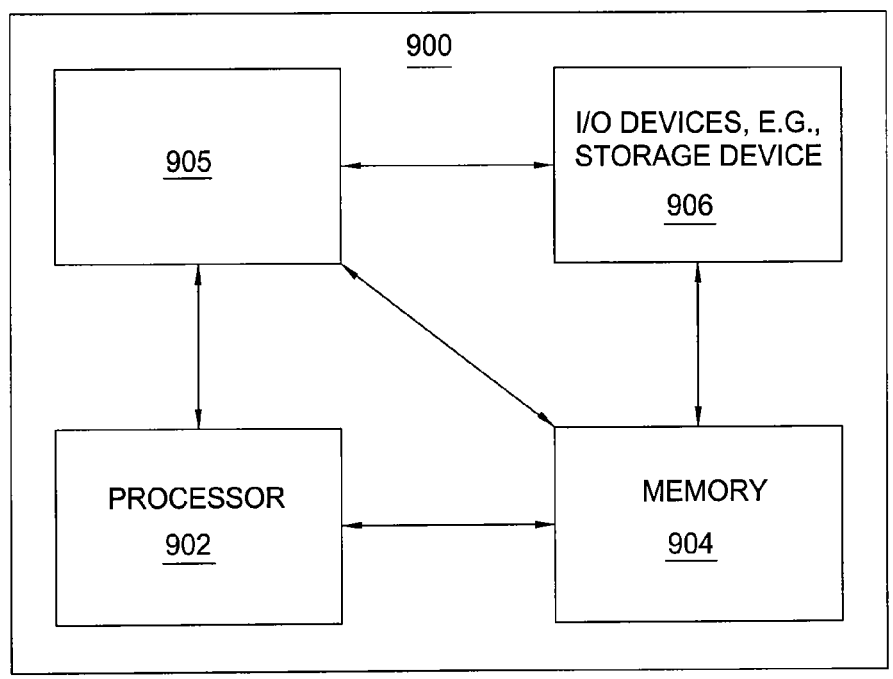
FIG. 9 depicts a high-level block diagram of a general-purpose computer suitable for use in performing the functions described herein.

FIG. 9 depicts a high-level block diagram of a general-purpose computer suitable for use in performing the functions described herein. As depicted in FIG. 9, system 900 comprises a processor element 902 (e.g., a CPU), a memory 904, e.g., random access memory (RAM) and/or read only memory (ROM), a node authentication module 905, and various input/output devices 906 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present node authentication process 905 can be loaded into memory 904 and executed by processor 902 to implement the functions as discussed above. As such, node authentication process 905 (including associated data structures) of the present invention can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Furthermore, although primarily depicted and described with respect to rapidly deployable networks, the present invention may be used in various other ad-hoc networks. The present invention is advantageous in any ad hoc network in which nodes may arrive at an existing network and request to be authenticated in order to be able to join the network. The present invention provides a more secure method for distributing encryption keys within ad hoc networks. Although primarily depicted and described with respect to being implemented using a modified version of EAP-TLS, the present invention may be implemented using modified versions of various other EAP protocols. Similarly, although primarily depicted and described with respect to being implemented using a modified version of EAP, the present invention may be implemented using other authentication protocols.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for authenticating a wireless node requesting to join a wireless network, the method comprising:
    receiving, at an authentication server node, an authentication request from the wireless node;
    negotiating at least one authentication parameter with the wireless node;
    receiving, from the wireless node, a first encryption key derived using the at least one authentication parameter;
    deriving a second encryption key using the first encryption key and the at least one authentication parameter, wherein the second encryption key is independently derived at the wireless node;
    encrypting a third encryption key using the second encryption key to form an encrypted third encryption key; and
    propagating the encrypted third encryption key toward the wireless node.

2. The method of claim 1, wherein the second encryption key comprises an Extensible Authentication Protocol (EAP) Pairwise Master Key (PMK).

3. The method of claim 1, wherein the third encryption key comprises one of a unicast encryption key, a multicast encryption key, and a broadcast encryption key.

4. The method of claim 1, wherein negotiating the at least one authentication parameter with the wireless node is performed using an Extensible Authentication Protocol (EAP) method.

5. The method of claim 1, further comprising:
    after receiving the authentication request and prior to negotiating the at least one authentication parameter, establishing a secure tunnel between the wireless node and the authentication server node; and
    negotiating the at least one authentication parameter with the wireless node using the secure tunnel.

6. The method of claim 5, wherein the secure tunnel is established using one of Extensible Authentication Protocol-Tunneled Transport Layer Security (EAP-TTLS) or Protected Extensible Authentication Protocol (PEAP).

7. The method of claim 1, wherein the wireless node comprises an access node portion and a supplicant node portion, wherein the supplicant node portion is adapted to derive the second encryption key for use in decrypting the encrypted third encryption key.

8. An apparatus for authenticating a wireless node requesting to join a wireless network, comprising:
    a processor and a memory communicatively connected to the processor, the processor configured to:
        receive, at an authentication server node, an authentication request from the wireless node;
        negotiate at least one authentication parameter with the wireless node;
        receive, from the wireless node, a first encryption key derived using the at least one authentication parameter;
        derive a second encryption key using the first encryption key and the at least one authentication parameter, wherein the second encryption key is independently derived at the wireless node;
        encrypt a third encryption key using the second encryption key to form an encrypted third encryption key; and
        propagate the encrypted third encryption key toward the wireless node.

9. A method for authenticating a wireless node requesting to join a wireless network, comprising:
    negotiating at least one authentication parameter with an authentication server node;
    providing, from the wireless node toward the authentication server node, a first encryption key derived using the at least one authentication parameter;
    deriving, at the wireless node, a second encryption key using the first encryption key and the at least one authentication parameter, wherein the second encryption key is independently derived at the authentication server node; and
    receiving, at the wireless node from the authentication server node, a message including an encrypted third encryption key, wherein the encrypted third encryption key is an encrypted version of a third encryption key, wherein the third encryption key is encrypted using the second encryption key to form the encrypted third encryption key, wherein the third encryption key is adapted for use by the wireless node in communicating with at least one other node of the wireless network.

10. The method of claim 9, further comprising:
receiving a packet from a wireless user device;
retrieving the third encryption key from the memory;
encrypting the packet using the third encryption key to form an encrypted packet; and
transmitting the encrypted packet toward another node.

11. The method of claim 9, further comprising:
receiving an encrypted packet from another node;
retrieving the third encryption key from the memory;
decrypting the encrypted packet using the third encryption key to recover a packet; and
transmitting the packet toward a wireless user device for which the packet is intended.

12. The method of claim 9, wherein the second encryption key comprises an Extensible Authentication Protocol (EAP) Pairwise Master Key (PMK).

13. The method of claim 9, wherein the third encryption key comprises one of a unicast encryption key, a multicast encryption key, and a broadcast encryption key.

14. The method of claim 9, wherein negotiating the at least one authentication parameter with the authentication node is performed using an Extensible Authentication Protocol (EAP) method.

15. The method of claim 9, further comprising:
   prior to negotiating the at least one authentication parameter with the authentication server node, establishing a secure tunnel between the wireless node and the authentication server node; and
   negotiating the at least one authentication parameter with the authentication server node using the secure tunnel.

16. The method of claim 15, wherein the secure tunnel is established using one of Extensible Authentication Protocol-Tunneled Transport Layer Security (EAP-TTLS) or Protected Extensible Authentication Protocol (PEAP).

17. An apparatus for authenticating a wireless node requesting to join a wireless network, comprising:
   a processor and a memory communicatively connected to the processor, the processor configured to:
   negotiate at least one authentication parameter with an authentication server node;
   provide, from the wireless node toward the authentication server node, a first encryption key derived using the at least one authentication parameter;
   derive, at the wireless node, a second encryption key using the first encryption key and the at least one authentication parameter, wherein the second encryption key is independently derived at the authentication server node; and
   receive, at the wireless node from the authentication server node, a message including an encrypted third encryption key, wherein the encrypted third encryption key is an encrypted version of a third encryption key, wherein the third encryption key is encrypted using the second encryption key to form the encrypted third encryption key, wherein the third encryption key is adapted for use by the wireless node in communicating with at least one other node of the wireless network.

* * * * *